(12) United States Patent
Berlandier et al.

(10) Patent No.: US 11,061,662 B1
(45) Date of Patent: Jul. 13, 2021

(54) MAINTENANCE OF FAST-CHANGING SOFTWARE APPLICATIONS

(71) Applicant: International Business Machines Corporation, Armonk, NY (US)

(72) Inventors: Pierre C. Berlandier, San Diego, CA (US); Swaminathan Balasubramanian, Troy, MI (US); Sarbajit K. Rakshit, Kolkata (IN); Ravi Prakash Bansal, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/732,808

(22) Filed: Jan. 2, 2020

(51) Int. Cl.
  *G06F 8/65* (2018.01)
  *G06F 8/73* (2018.01)

(52) U.S. Cl.
  CPC . *G06F 8/65* (2013.01); *G06F 8/73* (2013.01)

(58) Field of Classification Search
  USPC .......................................................... 717/168
  See application file for complete search history.

(56) References Cited

U.S. PATENT DOCUMENTS

| | | | |
|---|---|---|---|
| 5,860,007 A | 1/1999 | Soni | |
| 6,256,773 B1 * | 7/2001 | Bowman-Amuah | G06F 8/71 |
| | | | 707/999.202 |
| 6,367,077 B1 | 4/2002 | Brodersen | |
| 7,908,601 B2 | 3/2011 | Clemm | |
| 8,209,660 B2 * | 6/2012 | Sundararajan | G06F 8/71 |
| | | | 717/105 |
| 8,572,566 B2 | 10/2013 | Gass | |
| 9,658,847 B2 | 5/2017 | Deluca | |
| 9,996,804 B2 | 6/2018 | Bowers | |
| 10,013,333 B2 | 7/2018 | Wood | |
| 2010/0023920 A1 * | 1/2010 | Chaar | G06Q 10/06 |
| | | | 717/102 |
| 2010/0077380 A1 * | 3/2010 | Baker | G06F 8/71 |
| | | | 717/120 |
| 2011/0296391 A1 * | 12/2011 | Gass | G06F 8/72 |
| | | | 717/168 |
| 2013/0339933 A1 * | 12/2013 | Walters | G06F 11/3692 |
| | | | 717/131 |
| 2015/0025925 A1 * | 1/2015 | Moore | G06Q 10/063 |
| | | | 705/7.11 |
| 2017/0262360 A1 | 9/2017 | Kochura | |
| 2019/0317760 A1 * | 10/2019 | Kessentini | G06F 8/72 |

OTHER PUBLICATIONS

"Code Templates"; SmartBear.com website [full url in ref.]; Jun. 30, 2017 (Year: 2017).*
"How to: Update Existing Templates"; Microsoft.com Website [full url in ref.]; Jan. 2, 2018 (Year: 2018).*

* cited by examiner

*Primary Examiner* — Qing Chen
*Assistant Examiner* — Clint Thatcher
(74) *Attorney, Agent, or Firm* — Van Leeuwen & Van Leeuwen; Alexander G. Jochym

(57) ABSTRACT

An approach is provided in which the approach analyzes a set of code artifact changes from historical updates of a software application. The approach determines that a first code artifact and a second code artifact change in tandem and generates a change template based on the set of code artifact changes. The approach uses the change template to update the software application in response to receiving a request to apply the change template to the software application.

20 Claims, 7 Drawing Sheets

US 11,061,662 B1

MAINTENANCE OF FAST-CHANGING SOFTWARE APPLICATIONS

BACKGROUND

Low code development platforms are contributing to unprecedented fast-paced software application releases and updates. Low code development platforms, such as Decision Management Systems (DMS), automate time-consuming manual processes and use a visual integrated development environment (IDE) and automation that connects to a backend and application lifestyle management system. A Business Rules Management System (BRMS) is one type of DMS where business users update business rules to implement and deploy changes to the business logic.

Other factors that contribute to fast-paced software application releases and updates are a move towards new, non-monolithic architecture models such as microservices architectures. Microservices architectures involve designing applications as a suite of independently deployable, small, modular services referred to as "microservices." Each microservice executes a unique process and communicates through a well-defined, lightweight mechanism to serve a business goal using communication protocols. Microservices architectures have become a preferred way of developing software systems that operate in cloud-based environments.

BRIEF SUMMARY

According to one embodiment of the present disclosure, an approach is provided in which the approach analyzes a set of code artifact changes from historical updates of a software application. The approach determines that a first code artifact and a second code artifact change in tandem and generates a change template based on the set of code artifact changes. The approach uses the change template to update the software application in response to receiving a request to apply the change template to the software application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
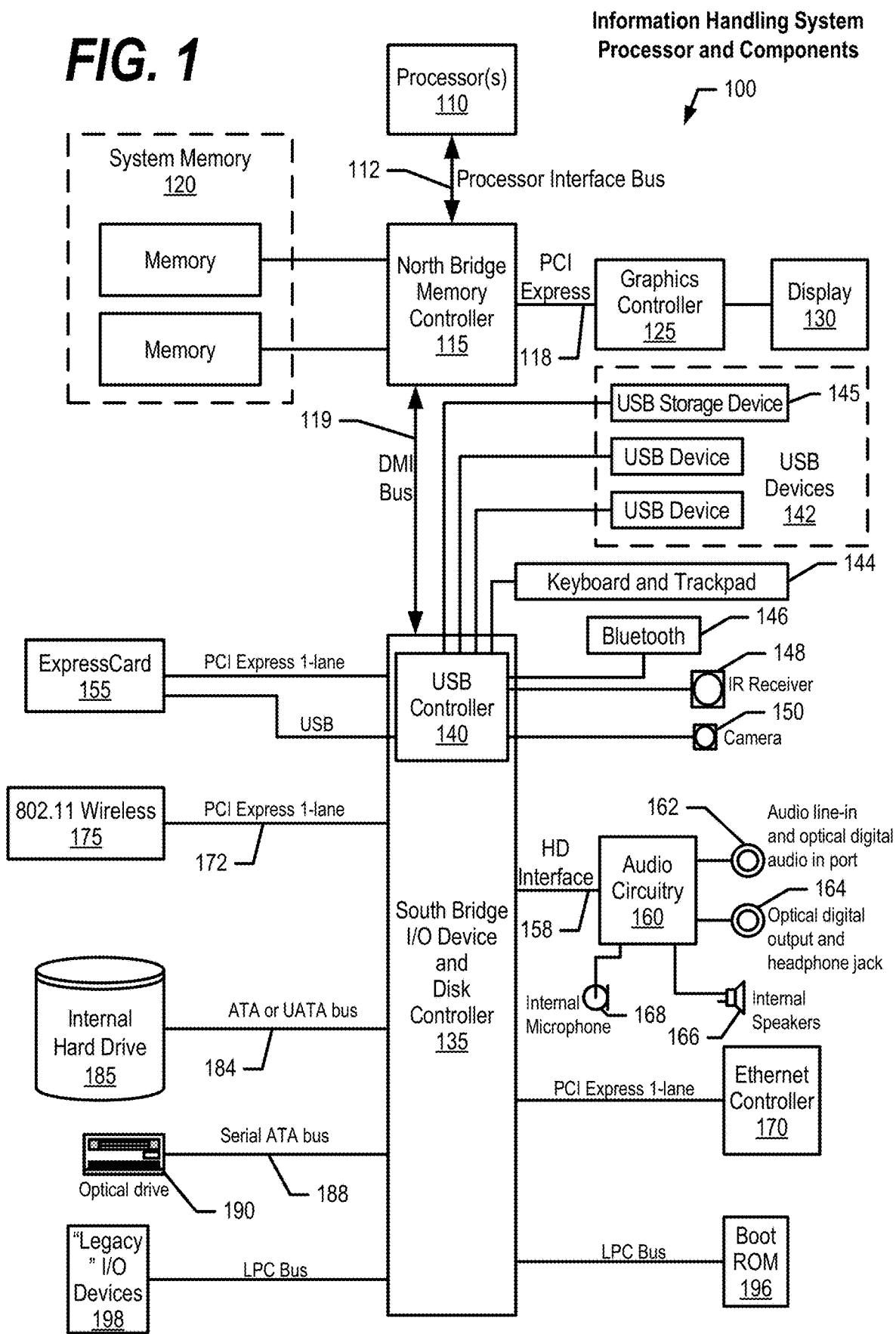
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
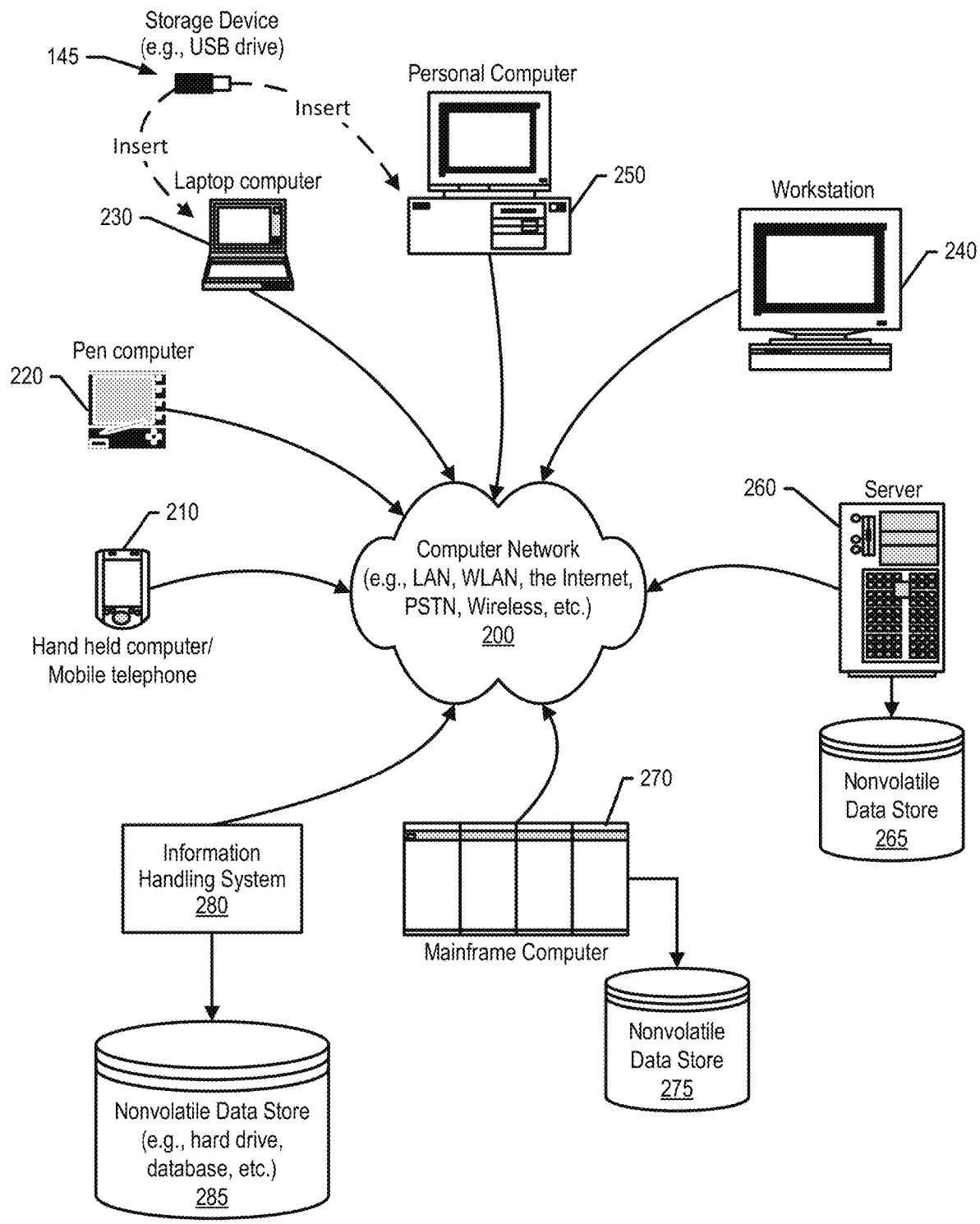
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, modern software solutions contribute to unprecedented fast-paced software application releases. A challenge found in large, fast-paced software application updates is that their software releases typically include encapsulated code updates with multiple changes in different areas of the software update that include undetected software bugs. In addition, large software application updates may fail to update one or more code artifacts that should change as part of a business change, which in turn results in further software bugs.

FIGS. 3 through 7 depict an approach that can be executed on an information handling system that assists software developers in completing software application maintenance updates by deriving business change patterns from previous code releases and applying the business change patterns to new software application updates. After a number of software update releases are deployed, the approach evaluates the composition of prior releases and determines which code artifacts have changed. The approach then uses unsupervised Machine Learning (ML) on the code artifact changes to determine clusters of artifacts that change in tandem (change sets). In one embodiment, the ML algorithm is applied at a level of individual code artifacts to locate where and how a region of the code should be updated. Each change set represents a set of operations to perform together to achieve a meaningful update to the software solution. The approach inspects, fine-tunes, and labels the change sets to generate a change template from the change sets.

Various user roles are then able to use the change templates when initiating a new release. For example, project managers use the change templates as detailed development plans for accurate workload estimates, durations, etc. In another example, developers use the change templates as a guide for implementing code updates. In yet another example, testers use the change templates as a guide to create or update test scenarios.

In one embodiment, the approach focuses on early phases of a software update process (coding, testing code) instead of focusing on latter phases of the software update process (building application, merging code). In this embodiment, the approach learns common change sets that assist the developer during code changes and testing activities instead of assisting the developer during the code release activities.

Figure 3:
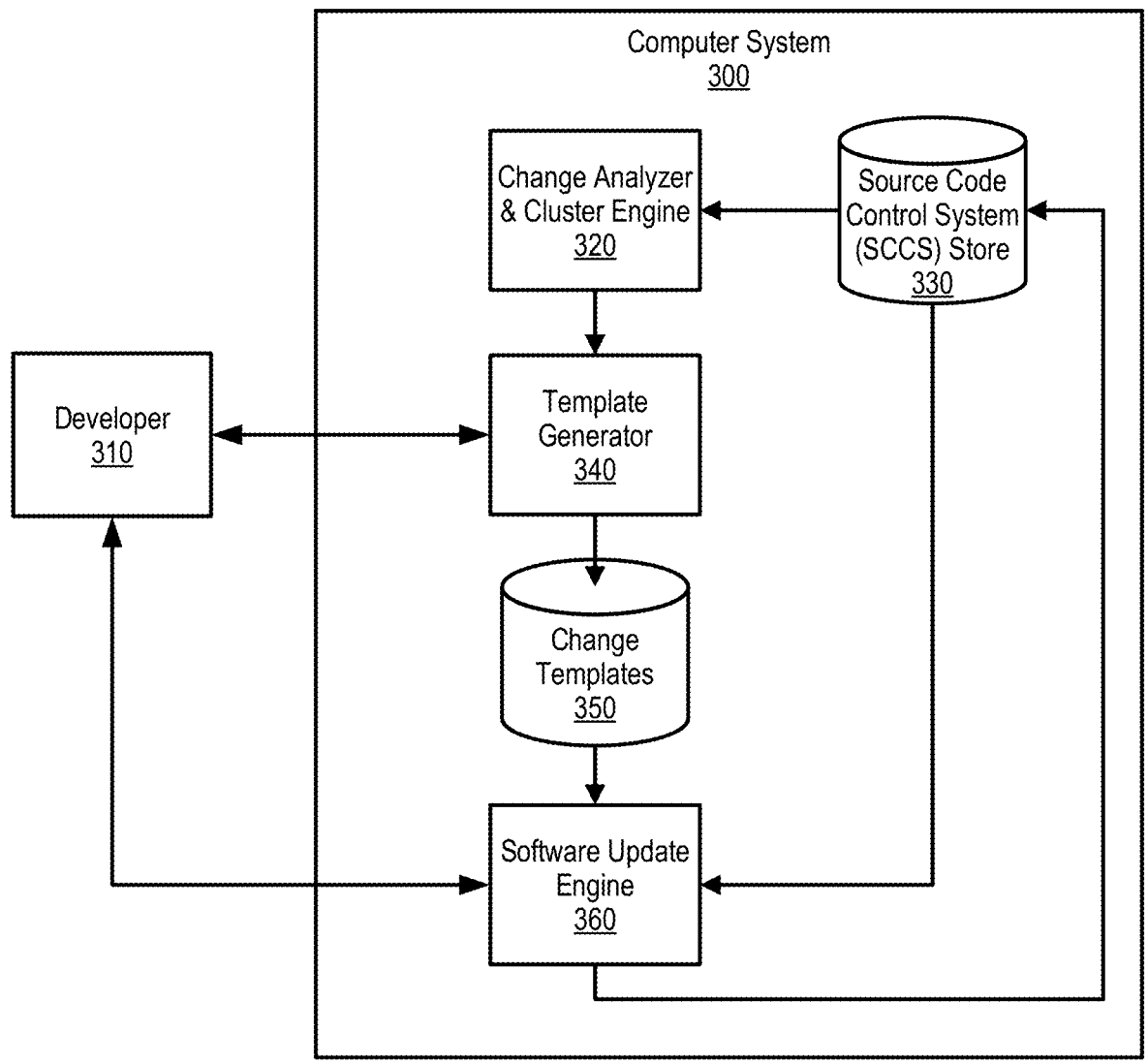
FIG. 3 is an exemplary diagram depicting a computer system that generates change templates based on historical code modifications and provides the change templates to a developer to guide the developer in future code changes.

FIG. 3 is an exemplary diagram depicting a computer system that generates change templates based on historical code modifications and provides the change templates to a developer to guide the developer during future code changes. Computer system 300 includes change analyzer and cluster engine 320, which evaluates existing application releases in source code control system (SCCS) store 330 to determine code artifact change sets in each release. In one embodiment, SCCS store 330 is part of a version control system designed to track changes in source code and other text files during software development. Change analyzer and cluster engine 320 then applies an unsupervised machine learning (ML) algorithm to the code artifact changes to determine clusters of code artifacts that change in tandem, referred to herein as "change sets" (see FIG. 5 and corresponding text for further details).

In one embodiment, template generator 340 provides the change sets to developer 310 for review. In turn, template generator 340 receives input from developer 310 and refines the change sets based on the received input to generate change templates. In one embodiment, the change templates are high-level code maintenance operations (see FIG. 7 and corresponding text for further details). Template generator 340 stores the change templates in change templates store 350 for use by developer 310 during software application updates as discussed below.

In one embodiment, for each code artifact in a change template, template generator 340 analyzes the changes from release to release to determine commonalities, such as identifying the same code statements being modified or the same values being changed from release to release. When template generator 340 identifies the same values being changed from release to release, template generator 340 may enrich a change template based on analyzing the value's gradient of change between updates. For example, template generator 340 may detect that an integer value in a script always increases from one release to the next release. In this example, template generator 340 enriches the change template to capture the increasing gradient.

In another embodiment, for software platforms where code entities have a small granularity, such as rules in a decision management platform, template generator 340 defines templates as operational configuration files that enforce constraints on code artifact editors (e.g. only a certain statement in the rule can be changed or the value in a statement can only take a value that is larger than the current value).

When developer 310 begins an update to a software solution, developer 310 uses software update engine 360 to select applicable templates from change templates store 350. Developer 310 then opens the selected templates and sends an acknowledgment to run the templates with software update engine 360. Software update engine 360 proceeds through prescribed template changes in context of the code artifacts and allows developer 310 to apply prescribed code statement changes, enter new values, etc. (see FIG. 6 and corresponding text for further details). For example, the changes may entail a complex code update that spans multiple code artifacts that are frequently exercised.

In one embodiment, during template selection, computer system 300 implements a template categorization approach (e.g., templates applying to pricing change, templates applying to eligibility change, etc. . . . ). In this embodiment, computer system 300 associates (annotates) tags to templates for quick retrieval (e.g., #pricing #texas) and/or leverages NLU (natural language understanding). In this embodiment, developer 310 indicates a change requirement in a natural language and computer system 300 matches concepts and keywords from the change requirement against the template tags to extract a relevant subset of the templates from change templates store 350 to provide to developer 310.

Figure 4:
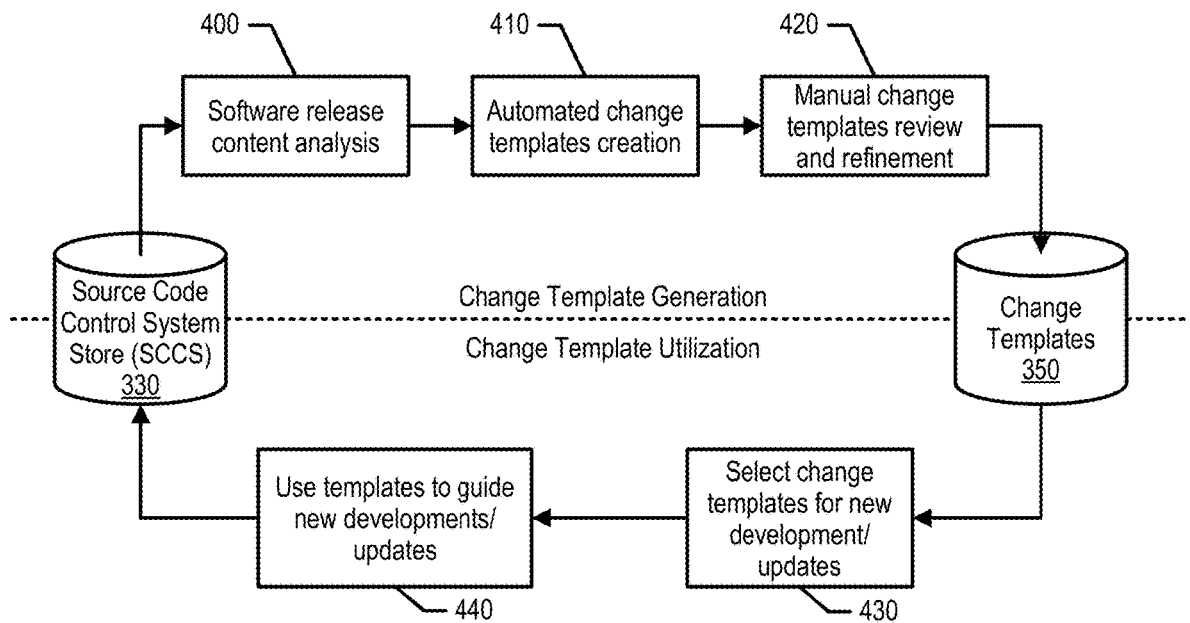
FIG. 4 is an exemplary diagram depicting a recurring feedback loop that generates change templates based on historical source code changes and utilizes the change templates as guidance to generate new software code releases and updates.

FIG. 4 is an exemplary diagram depicting a recurring feedback loop that generates change templates based on historical source code changes and utilizes the change templates as guidance to generate new software code releases and updates. Computer system 300 uses data mining and machine learning to identify typical changes that are recurrently applied to an application, creates a catalog of instrumented change set templates, and assists developer 310 in applying the change set templates to new software application updates.

Stages 400, 410, and 420 pertain to generating a change template. In one embodiment, computer system 300 automates discovery of commonly applied change sets and determines types of applicable changes to guide developer 310's coding and testing activities. At stage 400, computer system 300 analyzes software content in SCCS store 330. Then, at stage 410, computer system 300 automatically creates change templates based on the analysis from stage 400. Developer 310, in one embodiment, provides input at stage 420 and the change templates are stored in change templates store 350.

Stages 430 and 440 pertain to utilizing change templates to guide developer 310 in new software development and updates. In one embodiment, computer system 300 assists developer 310 early in the development process and in a prescriptive way instead of waiting to use the change sets to assist developer 310 in merging changes after the changes have been coded. At stage 430, developer 310 searches change templates store 350 for applicable templates to apply to developer 310's software update.

At stage 440, computer system 300 provides the selected change templates to developer 310 to assist developer 310 in new software developments and updates. In turn, the new software developments and updates are stored in SCCS 330, which computer system 300 further evaluates to refine and generate new change templates (stages 400, 410, and 420). In one embodiment, in steady state, the cycle shown on FIG. 4 is event-driven where the event trigger is a new release that starts at stage 430 and ends at stage 420. In this embodiment, an organization may decouple stages 430 and 440 from stages 400, 410, and 420. The later steps that identify new templates or enrich existing templates may be occasionally executed by a specialized team with some established governance rules on the change templates.

Figure 5:
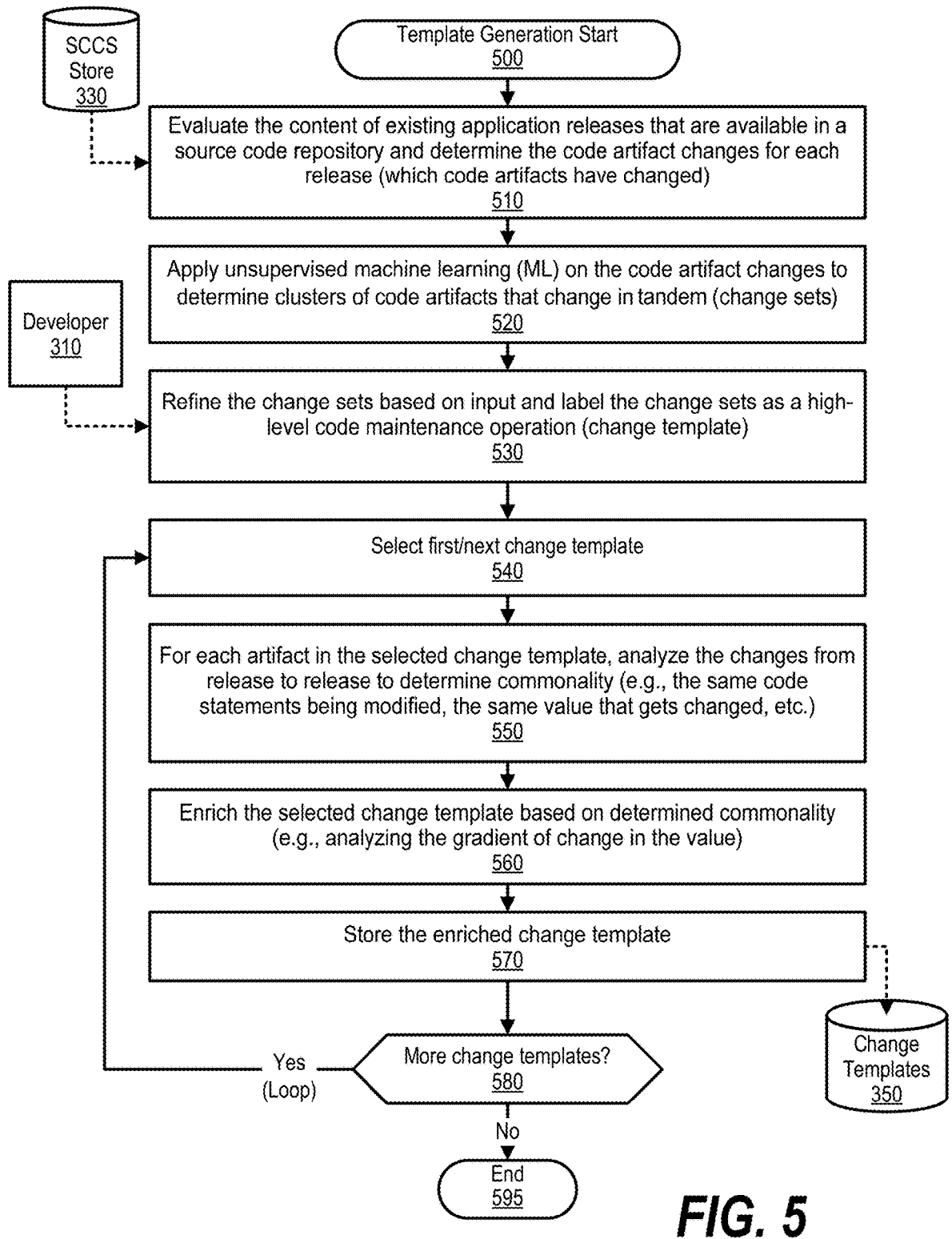
FIG. 5 is an exemplary flowchart showing steps taken to generate a change template.
Figure 7:
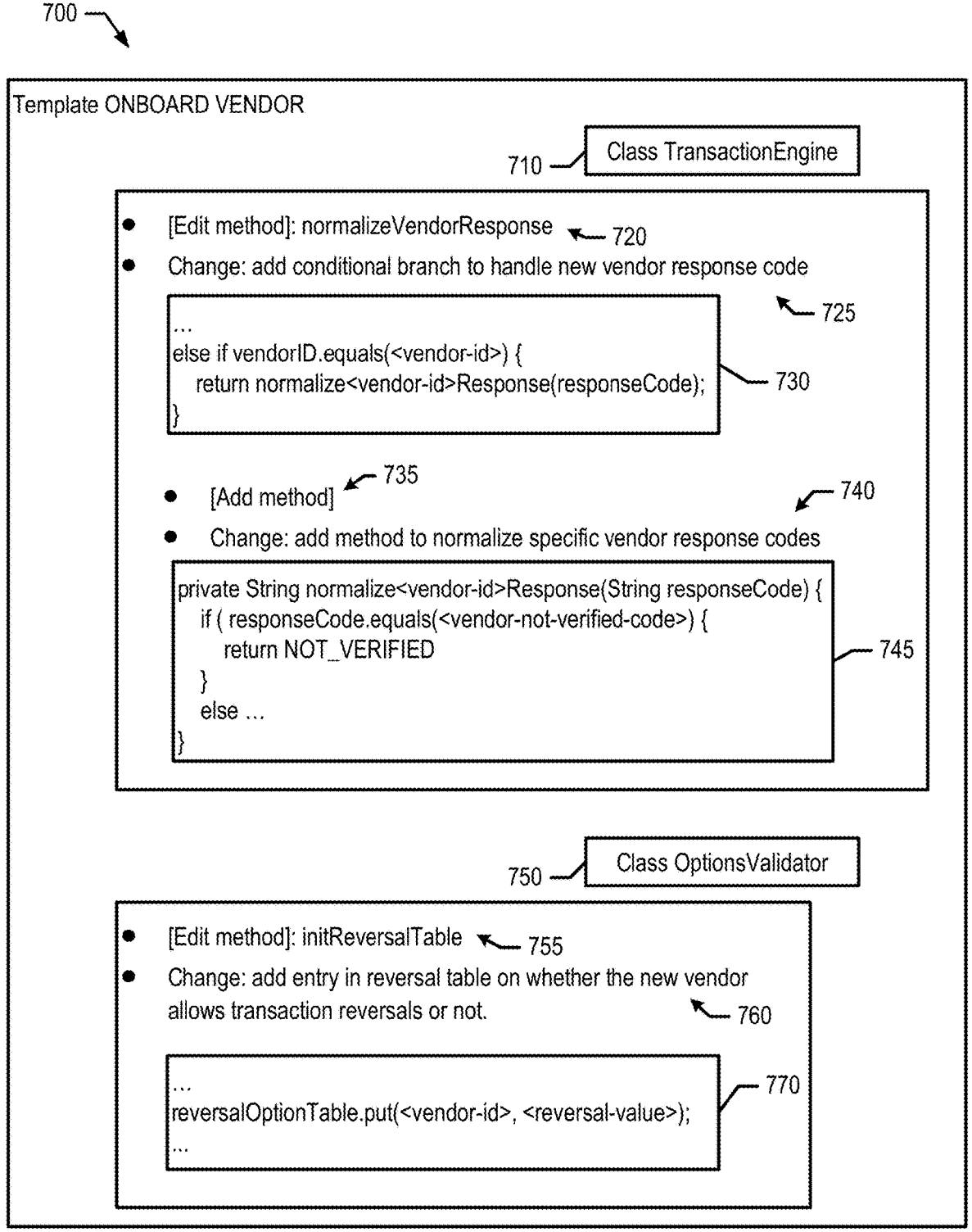
FIG. 7 is an exemplary diagram of a change template generated by the approach discussed herein.

FIG. 5 is an exemplary flowchart showing steps taken to generate a change template. FIG. 5 processing commences at 500 whereupon, at step 510, the process evaluates content of existing application releases that are available in Source Code Control System (SCCS) store 330 and determines the code artifact changes for each release (which code artifacts have changed). In one embodiment, a change is characterized by 3 aspects: (i) the code artifact on which a change has been observed from a source code control point of view (e.g., the file that contains the code); (ii) the type of change that is performed (add, delete, edit); and (iii) meaningful syntactic blocks where the change occurred (e.g., a declared statement such as a method that encapsulates the statements that changed, an inner class that is added, a class constant, etc.). For example, in a rule-based system, a change is a condition part and/or an action part of a rule that has changed. Referring to FIG. 7, a code artifact change example is an edit to an "initReversalTable" method 755 in a file that implements an "OptionsValidator" class 750, such as an OptionsValidator.java file in the case of a Java implementation.

In one embodiment, if a change is described by a triplet <Code artifact, Type of change, Declared name>, template generator 340 generates the example in FIG. 7 from three detected changes:

<TransactionEngine, edit method, normalizeVendorResponse>
    <TransactionEngine, add method>
    <OptionValidator, edit method, initReversalTable>

At step 520, in one embodiment, the process applies an unsupervised machine learning (ML) algorithm on the code artifact changes to determine clusters of code artifacts that change in tandem, referred to herein as change sets. For example, when a number of vendors are on-boarded throughout successive releases of a software application, the process applies a clustering algorithm on the changes from the successive releases and generates the cluster of the three changes shown above.

At step 530, in one embodiment, the process refines the change sets based on input (change set updates) from developer 310 and labels the change sets as high-level code maintenance operations, referred to herein as change templates. For example, developer 310 may review the content of a change set and determine that some of the changes may not be required and others may be missing. In turn, developer 310 documents the changes to perform and adds pertinent details to guide a future user of the template (see FIG. 7, reference numerals 725, 740, and 760).

At step 540, the process selects the first change template and, at step 550, for each code artifact in the selected change template, the process analyzes the changes between code releases to determine a commonality (e.g., the same code statements being modified, the same value that is changed, etc.). At step 560, the process enriches the selected change template based on the determined commonality (e.g., analyzing the gradient of change in the value). For example, referring to FIG. 7's initReversalTable 755 change, a new statement is added for each release that involves a vendor on-boarding and the code statements are similar in nature, such as:

In release n: reversalOptionTable.put(vendA, true);
    In release m: reversalOptionTable.put(vendB, true);
    In release p: reversalOptionTable.put(vendC, false);

In this example, the process determines that the common change to make is of the form reversalOptionTable.put (<vendor-id>, <reversal-value>). In turn, the process adds the templatized/generalized statement to the template.

In a gradient example, a change set increases a maximum transaction amount involving a constant MAX_TRANSACTION_AMOUNT and in successive releases, the process observes the following changes:

In release a: double MAX_TX_AMOUNT=125000.00;
    In release b: double MAX_TX_AMOUNT=128000.00; and
    In release c: double MAX_TX_AMOUNT=133000.00.

In this example, the process detects that the pattern of change for the value increases with each new release. As such, the process adds a directive (comment) to the template to change the current value to a higher value. In one embodiment, software update engine 360 prompts developer 310 for a new value for MAX_TX_AMOUNT and validates that the value provided is higher than the current value.

Figure 6:
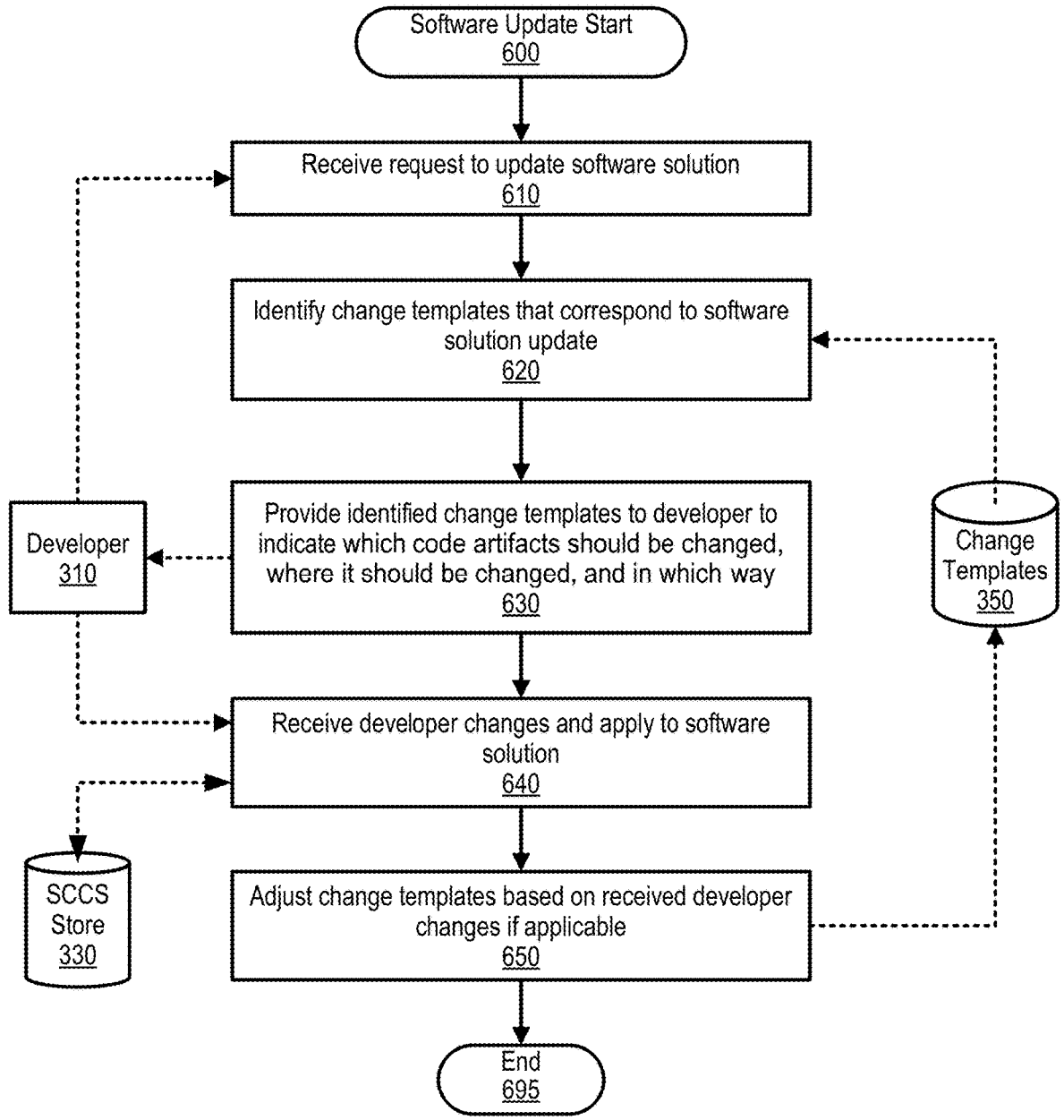
FIG. 6 is an exemplary flowchart showing steps taken in using a change template to assist a developer in generating a software application update.

At step 570, the process stores the enriched change template in change templates store 350 for further use by developer 310 during code updates and/or new code generation (see FIG. 6 and corresponding text for further details).

The process determines as to whether there are more change templates to analyze and enrich (decision 580). If there are more change templates to analyze and enrich, then decision 580 branches to the 'yes' branch which loops back to step 540 to select and process the next change template. This looping continues until there are no more change templates to analyze and enrich, at which point decision 580 branches to the 'no' branch exiting the loop. FIG. 5 processing thereafter ends at 595.

FIG. 6 is an exemplary flowchart showing steps taken in using a change template to assist developer 310 in generating a software application update. FIG. 6 processing commences at 600 whereupon, at step 610, the process receives a request from developer 310 to update a software application. At step 620, the process identifies change templates that correspond to software solution update that, as discussed above, are identified using template categorization.

At step 630, the process provides the identified change templates to developer 310 to inform developer 310 which code artifacts should be changed, locations in the code where the code artifacts should be changed, and how the code artifacts should be changed (see FIG. 7 and corresponding text for further details).

At step 640, the process receives code changes and an acknowledgement from developer 310 to apply the change template to the software application solution. The process proceeds through prescribed template changes in context of the code artifacts and allows developer 310 to apply prescribed code statement changes, enter new values, etc. to the software application solution. At step 650, the process adjusts the change templates based on the received developer changes if applicable. In one embodiment, the adjustment of the change template does not necessarily immediately follow the use of the change template. Referring to FIG. 4, once the templates are applied to assist implementing the release (440), the templates adjustment is performed by the sequence 400, 410, and 420, which may be decoupled from the "Change Template Utilization" phase. FIG. 6 processing thereafter ends at 695.

FIG. 7 is an exemplary diagram of a change template generated by the approach discussed herein. Onboard vendor template 700 groups all the change steps that are required to perform a meaningful code update. In one embodiment, change steps are segmented by code artifacts (e.g. code for a given class in Java) and changes are further segmented by entities in the code artifact, such as segmented by methods in the Java class.

Template 700 includes two classes "TransactionEngine" 710 and "OptionsValidator" 750 that computer system 300 determined were historically changing in tandem based on using an unsupervised machine learning clustering algorithm on code artifact changes as discussed herein. Template 700 shows that, by analyzing successive changes in the TransactionEngine class 710, computer system 300 determined that method normalizeVendorResponse 720 changed and a method 735 was added. As such, template 700 includes instruction 725 with code 730 and instruction 740 with code 745 to assist developer 310 in the software application update.

Similarly, template 700 shows that, by analyzing successive changes in the "OptionsValidator" class 750, computer system 300 determined that method "initRevsersalTable" 755 changed. As such, template 700 includes instruction 760 with code 770 to assist developer 310 in the software application update.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   determining that a first code artifact and a second code artifact change in tandem in response to analyzing a set of code artifact changes corresponding to a plurality of historical updates of a software application, wherein the software application comprises the first code artifact and the second code artifact;
   in response to the determination, generating a change template based on the set of code artifact changes, wherein the change template comprises the first code artifact and the second code artifact; and
   using the change template to update the software application in response to receiving a request to apply the change template to the software application.

2. The method of claim 1 wherein the generating of the change template further comprises:
   applying an unsupervised machine learning (ML) algorithm to the set of code artifact changes;
   grouping the set of code artifact changes into one or more change sets in response to applying the unsupervised machine learning (ML) algorithm to the set of code artifact changes;
   in response to providing the one or more change sets to a developer, receiving a set of change set updates from the developer; and
   refining the one or more change sets based on the set of change set updates.

3. The method of claim 2 further comprising:
   analyzing the refined one or more change sets to determine a commonality between the first code artifact and the second code artifact; and
   enriching the change template based on the determined commonality.

4. The method of claim 3 further comprising:
   detecting that the commonality is a change in an integer value during the historical updates; and
   integrating the change in the integer value into the change template.

5. The method of claim 1 further comprising:
   annotating the change template with a set of keyword tags; and
   storing the annotated change template in a storage area comprising a plurality of annotated change templates.

6. The method of claim 5 further comprising:
   extracting a set of keywords from the request sent by a developer; and
   selecting the annotated change template from the plurality of annotated change templates in response to matching the extracted set of keywords to the set of keyword tags.

7. The method of claim 1 further comprising:
   receiving a set of developer changes in response to providing the change template to a developer;
   applying the set of developer changes during the updating of the software application; and
   modifying the change template based on the set of developer changes.

8. An information handling system comprising:
   one or more processors;
   a memory coupled to at least one of the processors;
   a set of computer program instructions stored in the memory and executed by at least one of the processors in order to perform actions of:
      determining that a first code artifact and a second code artifact change in tandem in response to analyzing a set of code artifact changes corresponding to a plurality of historical updates of a software application, wherein the software application comprises the first code artifact and the second code artifact;
      in response to the determination, generating a change template based on the set of code artifact changes, wherein the change template comprises the first code artifact and the second code artifact; and
      using the change template to update the software application in response to receiving a request to apply the change template to the software application.

9. The information handling system of claim 8 wherein the processors perform additional actions comprising:
   applying an unsupervised machine learning (ML) algorithm to the set of code artifact changes;
   grouping the set of code artifact changes into one or more change sets in response to applying the unsupervised machine learning (ML) algorithm to the set of code artifact changes;
   in response to providing the one or more change sets to a developer, receiving a set of change set updates from the developer; and
   refining the one or more change sets based on the set of change set updates.

10. The information handling system of claim 9 wherein the processors perform additional actions comprising:

analyzing the refined one or more change sets to determine a commonality between the first code artifact and the second code artifact; and enriching the change template based on the determined commonality.

11. The information handling system of claim 10 wherein the processors perform additional actions comprising:

detecting that the commonality is a change in an integer value during the historical updates; and integrating the change in the integer value into the change template.

12. The information handling system of claim 8 wherein the processors perform additional actions comprising:

annotating the change template with a set of keyword tags; and storing the annotated change template in a storage area comprising a plurality of annotated change templates.

13. The information handling system of claim 12 wherein the processors perform additional actions comprising:

extracting a set of keywords from the request sent by a developer; and selecting the annotated change template from the plurality of annotated change templates in response to matching the extracted set of keywords to the set of keyword tags.

14. The information handling system of claim 8 wherein the processors perform additional actions comprising:

receiving a set of developer changes in response to providing the change template to a developer;

applying the set of developer changes during the updating of the software application; and modifying the change template based on the set of developer changes.

15. A computer program product stored in a computer readable storage medium, comprising computer program code that, when executed by an information handling system, causes the information handling system to perform actions comprising:

determining that a first code artifact and a second code artifact change in tandem in response to analyzing a set of code artifact changes corresponding to a plurality of historical updates of a software application, wherein the software application comprises the first code artifact and the second code artifact;

in response to the determination, generating a change template based on the set of code artifact changes, wherein the change template comprises the first code artifact and the second code artifact; and using the change template to update the software application in response to receiving a request to apply the change template to the software application.

16. The computer program product of claim 15 wherein the information handling system performs further actions comprising:

applying an unsupervised machine learning (ML) algorithm to the set of code artifact changes;

grouping the set of code artifact changes into one or more change sets in response to applying the unsupervised machine learning (ML) algorithm to the set of code artifact changes;

in response to providing the one or more change sets to a developer, receiving a set of change set updates from the developer; and refining the one or more change sets based on the set of change set updates.

17. The computer program product of claim 16 wherein the information handling system performs further actions comprising:

analyzing the refined one or more change sets to determine a commonality between the first code artifact and the second code artifact; and enriching the change template based on the determined commonality.

18. The computer program product of claim 17 wherein the information handling system performs further actions comprising:

detecting that the commonality is a change in an integer value during the historical updates; and integrating the change in the integer value into the change template.

19. The computer program product of claim 15 wherein the information handling system performs further actions comprising:

annotating the change template with a set of keyword tags; and storing the annotated change template in a storage area comprising a plurality of annotated change templates.

20. The computer program product of claim 19 wherein the information handling system performs further actions comprising:

extracting a set of keywords from the request sent by a developer; and selecting the annotated change template from the plurality of annotated change templates in response to matching the extracted set of keywords to the set of keyword tags.

* * * * *